United States Patent Office 3,778,416
Patented Dec. 11, 1973

3,778,416
PROCESS FOR THE MANUFACTURE OF FILAMENTS AND FIBERS FROM ACRYLONITRILE COPOLYMERS
Robert Zoller, Alterschrofen, Walter Fester, Konigstein, Taunus, Franz Jakob, Hofheim, Taunus, and Alexander Dahmen, Schonberg, Taunus, Germany, assignors to Farbwerke Hoechst Aktiengesellschaft vormals Meister Lucius & Bruning, Frankfurt am Main, Germany
No Drawing. Filed Dec. 29, 1971, Ser. No. 213,822
Claims priority, application Germany, Jan. 7, 1971, P 21 00 450.2
Int. Cl. C08f 15/00, 15/40
U.S. Cl. 260—78 UA       3 Claims

ABSTRACT OF THE DISCLOSURE

The present invention provides a process for the manufacture of filaments and fibers from acrylonitrile copolymers and modacrylic copolymers by copolymerizing acrylonitrile or mixtures thereof with common modifying comonomers with 0.5 to 50% by weight, calculated on the monomer mixture, of N-substituted maleinimides and spinning the copolymers obtained. The filaments and fibers obtained are distinguished by a raised glass transition temperature and hence, an improved dimensional stability at elevated temperature, and by their excellent degree of whiteness.

---

The present invention relates to a process for the manufacture of filaments and fibers from acrylonitrile copolymers and/or modacrylic polymers having a high glass transition temperature and an excellent degree of whiteness by copolymerizing acrylonitrile with unsaturated monomers and spinning the copolymers obtained.

Depending on the polymerization catalyst used linear acrylonitrile polymers or linear copolymers of acrylonitrile with neutral comonomers produced in known manner contain only a small number of groups having an affinity for dyestuffs or they are fully deprived of such groups so that such polymers or copolymers cannot be dyed deep shades. Moreover, their glass transition temperature is too low for many applications, for example the stability of shape of textiles made therefrom is very poor in hot water under load.

It has been proposed to improve the dyestuff receptivity of polyacrylonitrile by producing copolymers of acrylonitrile with such comonomers as do contain acid or basic groups, for example unsaturated sulfonic acid or vinyl pyridine. Copolymers obtained in this manner have a better dyestuff receptivity but, when basic comonomers have been used for their manufacture, they have a strongly reduced thermostability and a poor degree of whiteness.

The glass transition temperature of polymers can be raised by producing cross linked polymers, either by adding suitable comonomers, for example divinyl benzene, during polymerization, or by subsequently exposing the polymers to radiation. In the former case the products obtained are often unfusible and insoluble and cannot be processed into filaments and fibers and in the latter case the polymers turn yellow as a consequence of radiation.

The copolymerization of acrylonitrile with N-arylmaleinimides yields substantially amorphous polymers the softening or melting temperature of which is so low that they can be further processed from the melt, but the products obtained always have a yellowish-brown color. Filaments and fibers made of such a polymer are unsuitable for textile purposes owing to their high plasticity at elevated temperature. To raise the melting point it is, therefore, necessary to add olefins as further comonomers when a polymer is desired having better properties for making fibers.

It is the object of the present invention to produce acrylonitrile copolymers in which a good receptivity for acid and/or basic dyestuffs is combined with a high glass transition temperature and a good thermostability, which copolymers are suitable for the manufacture of filaments, fibers and films. The present invention provides a process for the manufacture of filaments and fibers from acrylonitrile copolymers which comprises copolymerizing 99.5 to 50% by weight, all percentages being calculated on the monomer mixture, of acrylonitrile or a mixture of acrylonitrile with common modifying comonomers, and 0.5 to 50% by weight, of monomer of the general formula

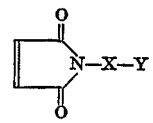

(I)

wherein X represents a straight chain or branched alkylene radical having 2 to 18, preferably 2 to 8, carbon atoms, a cycloalkylene, an alkylene-cycloalkylene, a cycloalkylene-alkylene and/or an alkylene-cycloalkylene-alkylene radical, which may carry one or more chlorine or bromine atoms, methoxy, ethoxy and/or alkyl radicals, and Y represents hydrogen or

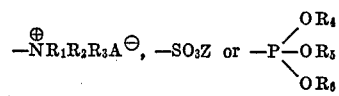

$R_1$ and $R_2$ being identical or different alkyl radicals having 1 to 4 carbon atoms or forming a six-membered ring with nitrogen, which ring may contain further hetero atoms such as oxygen, $R_3$ standing for hydrogen or an alkyl, cycloalkyl or aralkyl radical having up to 10 carbon atoms and possibly carrying as substituents alkoxycarbonyl, aminocarbonyl, hydroxyl, phenylsulfonylamidocarbonyl, epoxy groups or halogen atoms, $R_4$, $R_5$ and $R_6$ being hydrogen or alkyl radicals having 1 to 4 carbon atoms, $A^\ominus$ meaning the anion of an inorganic acid, for example sulfuric acid, sulfuric acid monomethyl ester, hydrochloric acid, phosphorous acid, phosphoric acid, or hydroiodic acid, or the anion of an organic acid, for example formic acid, acetic acid, benzenesulfonic acid, paratoluene-sulfonic acid, or naphthalene-sulfonic acid, or forming together with $R_3$ the radicals —$(CH_2)_3$—$SO_3^\ominus$ or —$(CH_2)_4$—$SO_3^\ominus$, or —$(CH_2)_n$—$COO^\ominus$ ($n=2$–$4$), and Z representing a protone, the cation of an alkali metal, for example $Li^\oplus$, $Na^\oplus$, $K^\oplus$, or the ammonium ion of a tertiary amine, for example the triethylammonium, N,N-dimethylanilinum, or pyridinium ion, and spinning the copolymers obtained into filaments and fibers.

The copolymers obtained by the process of the invention essentially consist of acrylonitrile units and units of at least one of the defined maleinimides. They may further contain other vinyl and/or vinylidene comonomers optionally carrying special functional groups, for example acrylic acid, methacrylic acid, crotonic acid, maleic acid, allylsulfonic acid, methallylsulfonic acid, styrene-sulfonic acid, or vinylphosphonic acid, or their methyl or ethyl esters, amides or alkali metal salts. Further suitable comonomers are vinyl acetate, vinyl chloride, vinylidene chloride, methylvinyl ketone, α-chloroacrylonitrile, acrylic acid β-aminoethyl ester, and vinyl pyridine.

The acrylonitrile copolymers prepared according to the invention thus consist of linear carbon chains which may also contain nitrogen if the polymerization of the acrylonitrile has partially also taken place by way of the nitrile groups. They are characterized in that they contain chain members having the following succinimide structure (Ia)

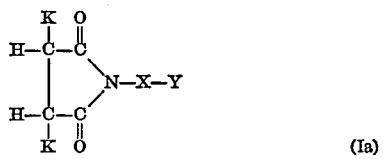

(Ia)

in which K indicates the continuous polymer chain and X and Y have the above meaning.

Suitable maleinimides are, for example, the following compounds:

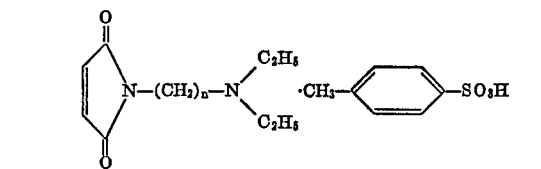

n=2-6

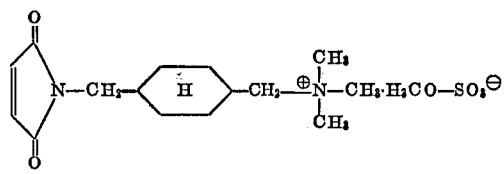

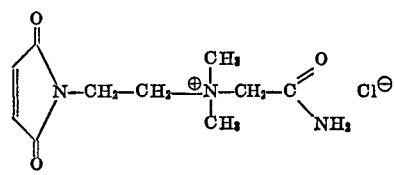

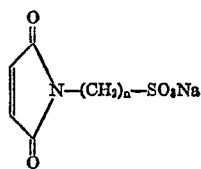

n=2-6

The continuous polymer chain is composed of polymerizable vinyl and/or vinylidene units and units of the defined maleinimides and thus contains groups of the above Formula Ia or structural units II–IV either individually or in combination depending on the comonomers used. The representation of the structural units II to IV is not intended to indicate their steric configuration.

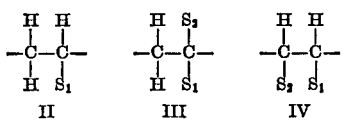

In Formulae II to IV the substituents have the following meaning:

$S_1$ = CN, Cl, Br, F, $R_4$, $OR_4$, O—CO—CH$_3$,
COOZ, COOR$_4$, CONR$_4$, R$_5$, COR$_4$,
SD$_3$Z, CH$_2$, SO$_3$Z,

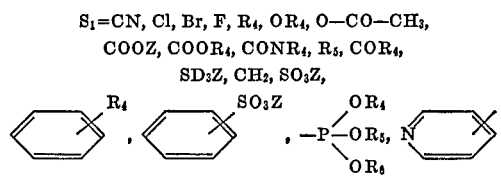

(the aromatic substituents being linked to the polymer chain in the 2-, 3-, or 4-position)

$S_2$ = F, Cl, Br, CN, R$_4$, COOZ (the symbols R$_4$, R$_5$, R$_6$, and Z have the meaning indicated above).

The preponderant portion of the polymers consists of structural units of Formula II in which $S_1$ stands for CN.

In the polymerization the specified comonomers are statistically incorporated into the polymer. It is thus possible that the structural unit Ia occurs several times side by side in the polymer, in which case the radicals X and Y may be identical or different. It is also possible, of course, to incorporate the succinimide grouping Ia in terminal position in the macromolecule, in which case, depending on the type of initiation and chain interruption, K for the continuous polymer chain is replaced by H, OSO$_3$Z or one of the known starting radicals formed in the decomposition of azo compounds, or alkyl, acyl and hydroperoxides, for example

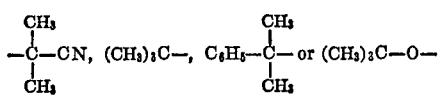

The maleinimides used for producing the copolymers of acrylonitrile according to the invention are prepared by known methods by dehydrating the corresponding maleic acid monoamides (cf. Org. Syntheses 41, page 93 (1961) or J. Org. Chem. 34, page 2275 (1969)).

These methods give, however, satisfactory yields only in the case of N-alkyl-maleinimides carrying neutral substituents. Maleinimides with tertiary amino groups or the quaternary derivatives thereof have in part not yet been described in literature. They are prepared by the process disclosed in our copending application Ser. No. 213,742 corresponding to German application P 2,100,440.0 filed concurrently herewith, by heating maleic acid monoamides of the general formula

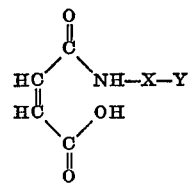

(V)

wherein X and Y have the above meaning in the high vacuum up to a temperature near the melting point and optionally transforming into their salts the imides obtained by distillation.

The polymerization according to the invention is carried out in the manner usual for acrylonitrile using as catalysts the known systems, for example potassium peroxy-disulfate/sodium pyrosulfite, azobisisobutyric acid nitrile or alkyl-, acyl- or hydroperoxides, optionally in the presence of small amounts of heavy metal ions, for example iron, cobalt, or vanadium. The suspension-precipitation polymerization is carried out, for example, in an acid medium, preferably having a pH of 3 to 5, at a temperature of from 20 to 70° C. in a nitrogen atmosphere under an excess pressure of the protective gas of about 10 mm. of mercury. Solution polymerization, preferably in dimethyl formamide or dimethyl sulfoxide, can be initiated not only by radicals but also by anions.

The amount of maleinimide used in the copolymerization strongly varies depending on the desired effect. To improve the dyestuff receptivity of the copolymers 0.5 to 20 and preferably 0.5 to 15% by weight, calculated on the monomer mixture, of acid and/or basic maleinimides or the derivatives thereof are incorporated by polymerization. To raise the glass transition temperature 5 to 50% and preferably 10 to 40% by weight, calculated on the monomer mixture, of N-alkyl-N-cycloalkyl-, N-alkyl-cycloalkyl-, N-alkyl-cycloalkyl-alkyl-, N-cycloalkyl-alkyl-maleinimide or mixtures thereof are copolymerized with acrylonitrile. It is also possible, of course, to combine the two effects by copolymerizing acrylonitrile with a mixture of maleinimides improving the dyestuff receptivity with neutral maleinimides. In this case the sum of the maleinimides should not be higher than 50% by weight and not be lower than 10% by weight, calculated on the monomer mixture.

The acrylonitrile polymers obtained by the process of the invention are processed into filaments and fibers by the conventional spinning processes for polyacrylonitrile, for example wet spinning of a dimethyl formamide solution into mixtures of dimethyl formamide and water, as well as dry spinning. The filaments and fibers obtained in this manner can be dyed deep shades with acid and/or basic dyestuffs. When only small amounts of acid or basic maleinimides are incorporated by copolymerization polymers are obtained which can be dyed light shades so that the application of the polymers in the field of differential dyeing technics appears to be very promising. The polymers of the invention have an outstanding degree of whiteness. From among their physical properties the considerably raised glass transition temperature is especially valuable. The dependency of the glass transition temperature on the amount of maleinimide incorporated by copolymerization is illustrated by the values indicated in the following table.

The following examples illustrate the invention, the percentages being by weight unless otherwise stated.

EXAMPLES 1 TO 6

The polymers indicated in the table below were prepared in the following manner:

In a reaction flask heated at 55° C. acrylonitrile and N-cyclohexyl maleinimide were polymerized in a continuous suspension precipitation polymerization using a catalyst system consisting of $K_2S_2O_8$ (0.33%) and $Na_2S_2O_5$ (1.32%) with $Fe^{2+}$ as cocatalyst. The monomers were added in a manner such that an about 25% suspension was obtained. By a sulfuric acid/sodium acetate buffer a pH of 3 was maintained in the polymerization medium. After an average polymerization period of 90 minutes the reaction was interrupted at a conversion of 75-80% by cooling the suspension to about 0° C. and the polymer formed was filtered off with suction. In the following table there are indicated the amounts of monomers used, the relative viscosities ($\eta_{rel.}$) of the polymers determined at 20° C. with a 0.5% solution in dimethyl formamide, and the glass transition temperature measured by differential thermoanalysis.

TABLE

| Example | Percent Acrylonitrile | Percent N-cyclohexylmaleinimide | $\eta_{rel.}$ | Glass transition temperature, ° C. From | To |
|---|---|---|---|---|---|
| Homopolymer | 100 | | 1.84 | 82 | −114 |
| 1 | 95 | 5 | 1.96 | 93 | −115 |
| 2 | 90 | 10 | 1.90 | 117 | −134 |
| 3 | 80 | 20 | 2.00 | 130 | −144 |
| 4 | 70 | 30 | 2.13 | 133 | −146 |
| 5 | 60 | 40 | 2.06 | 134 | −149 |
| 6 | 50 | 50 | 1.98 | 130 | −153 |

EXAMPLE 7

In the manner specified in the preceding examples, 85% of acrylonitrile, 5% of acrylic acid methyl ester and 10% of N-(2-diethyl-ammoniummethyl)-maleinimide para-toluenesulfonate were polymerized. The polymer obtained had a relative viscosity of 1.94.

At 60° C. a 23% solution of the copolymer in dimethyl formamide was prepared from which filaments were spun by a common wet spinning process, which filaments were drawn by 300% in water having a temperature of 90° C. A bundle of fibers made from the filaments was dyed for 90 minutes at the boil with 2%, calculated on the polymer, of the acid dyestuff No. 62,130 of Color Index, second edition, with a goods-to-liquor ratio of 1:40. The dyed fibers had a deep blue shape, while comparative fibers produced from a polymer of 95% of acrylonitrile and 5% of acrylic acid methyl ester did hardly absorb any dyestuff.

EXAMPLE 8

In the manner described in Examples 1–6, 85% of acrylonitrile, 10% of N-cyclohexyl-maleinimide and 5% of the quaternary maleinimide of the following formula

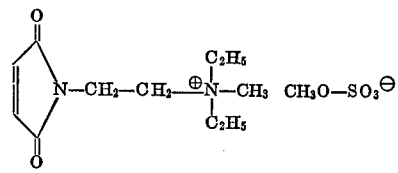

where copolymerized. In a yield of 70.5% a polymer was obtained having a relative viscosity of 1.90 and a glass transition temperature of 120 to 147° C. The polymer was spun into filaments as described in Example 7 and a bundle of fibers thereof was dyed with the dyestuff specified in Example 7. The fibers acquired a lighter shade than the fibers of Example 7.

What is claimed is:

1. In a process for the manufacture of filaments and fibers from acrylonitrile and modified acrylonitrile polymers by copolymerizing acrylonitrile with unsaturated monomers and spinning of the copolymers obtained, the improvement which comprises copolymerizing 99.5 to 50% by weight of acrylonitrile or a mixture of acrylonitrile with the common modifying comonomers and 0.5 to 50% by weight, all percentages being calculated on the monomer mixture, of at least one monomer of the general formula

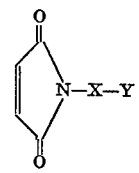

(I)

wherein X represents a straight chain or branched alkylene radical having 2 to 18 carbon atoms, a cycloalkylene, an alkylene-cycloalkylene, a cycloalkylene-alkylene or an alkylene-cycloalkylene-alkylene radical, possibly carrying at least one chlorine or bromine atom, methoxy, ethoxy or alkyl radical, and Y represents hydrogen or

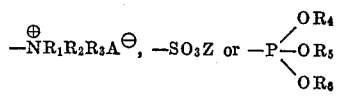

$R_1$ and $R_2$ each being an alkyl radical having 1 to 4 carbon atoms or alkylene radicals forming a six-membered ring together with the nitrogen atom or being linked to a six-membered ring via further hetero atoms, $R_3$ standing for hydrogen or an alkyl, cycloalkyl or aralkyl radical having up to 10 carbon atoms, $A^{\ominus}$ meaning the anion of an inorganic or organic acid or forming together with $R_3$ the radicals $-(CH_2)_3-SO_3^{\ominus}$, $-(CH_2)_4-SO_3^{\ominus}$, or

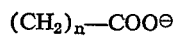

($n=2-4$), $R_4$, $R_5$, and $R_6$ each being hydrogen or an alkyl radical having 1 to 4 carbon atoms, and Z representing a protone, the cation of an alkali metal or the ammonium ion of a tertiary amine, and spinning the copolymers obtained into filaments and fibers.

2. The process of claim 1, wherein N-cyclohexyl-maleinimides are used as monomer of Formula I.

3. The process of claim 1, wherein 0.5 to 20% by weight of the monomer of Formula I are used.

References Cited

UNITED STATES PATENTS

| | | | |
|---|---|---|---|
| 3,352,832 | 11/1967 | Barr et al. | 260—78 |
| 2,708,663 | 5/1955 | Downing et al. | 260—78 |
| 3,651,171 | 3/1972 | Bonin et al. | 260—857 G |
| 2,650,215 | 8/1953 | Strain | 260—77.5 |
| 3,639,357 | 2/1972 | Cohen | 260—78 |
| 3,202,641 | 8/1965 | Nakajima et al. | 260—79.3 |

JOSEPH L. SCHOFER, Primary Examiner

J. KIGHT, Assistant Examiner

U.S. Cl. X.R.

8—116.2; 260—78.5 R, 85.5 AM